(12) United States Patent
Sun et al.

(10) Patent No.: US 11,306,511 B2
(45) Date of Patent: Apr. 19, 2022

(54) ROTARY UNLOCKING CENTRAL LOCK DEVICE FOR FOLDABLE TENT

(71) Applicant: ZHEJIANG JIANSHENG LEISURE PRODUCTS CO., LTD, Zhejiang (CN)

(72) Inventors: Yuanru Sun, Zhejiang (CN); Jian He, Zhejiang (CN)

(73) Assignee: ZHEJIANG JIANSHENG LEISURE PRODUCTS CO., LTD, Zhejiang (CN)

( * ) Notice: Subject to any disclaimer, the term of this patent is extended or adjusted under 35 U.S.C. 154(b) by 586 days.

(21) Appl. No.: 16/281,022

(22) Filed: Feb. 20, 2019

(65) Prior Publication Data
US 2019/0368232 A1  Dec. 5, 2019

(30) Foreign Application Priority Data

May 29, 2018 (CN) .......................... 201810530419.6
May 29, 2018 (CN) .......................... 201820809963.X

(51) Int. Cl.
*E05B 65/00* (2006.01)
*E04H 15/50* (2006.01)

(52) U.S. Cl.
CPC ........... *E05B 65/00* (2013.01); *E04H 15/505* (2013.01)

(58) Field of Classification Search
CPC ............. Y10T 292/097; Y10T 292/091; Y10T 292/0976; Y10T 292/0977; Y10T 292/1016; Y10T 292/102; Y10T 292/285; Y10T 292/286; Y10T 292/289; Y10T 292/291; Y10T 292/2935; Y10T 292/294; Y10T 292/304; Y10T 292/432; Y10T 292/4945; Y10T 292/502; Y10T 292/696; Y10T 292/388; Y10T 292/865; E04H 15/48; E04H 15/50; E04H 15/505; E05B 65/00; E05C 1/08; E05C 1/085; E05C 1/12; E05C 1/14; E05C 1/16; E05C 17/18; E05C 17/22; E05C 17/28; E05C 17/30
USPC ......... 70/57, 58, 59, 61, 181, 186, 201, 202, 70/204, 205; 292/305, 306, 265, 266, 292/271, 272, 273, 277
See application file for complete search history.

(56) References Cited

U.S. PATENT DOCUMENTS 1,330,117 A * 2/1920 Irish ...................... B60R 25/086
  70/202
1,352,290 A * 9/1920 Leonard .................... F24B 1/00
  126/59

(Continued)

FOREIGN PATENT DOCUMENTS

CN         206888665         1/2018

*Primary Examiner* — Suzanne L Barrett
(74) *Attorney, Agent, or Firm* — JCIP Global Inc.

(57) ABSTRACT

A rotary unlocking central lock device is adapted for a foldable tent. The rotary unlocking central lock device includes a top plate base, a lock rod, a lower plate base, and a rotary base. The rotary base is rotatably fit with the lower plate base. A lock rod latch mechanism is disposed between the rotary base and the lower plate base. A top portion of the lock rod is fixed with the top plate base. A bottom portion of the lock rod penetrates through the lower plate base to fit with the lock rod latch mechanism. Locking and unlocking of the lock rod and the lock rod latch mechanism can be realized by rotation of the rotary base.

19 Claims, 8 Drawing Sheets

(56) References Cited

U.S. PATENT DOCUMENTS

| | | | | |
|---|---|---|---|---|
| 1,384,883 A | * | 7/1921 | Barker | B42F 13/12 402/46 |
| 1,406,231 A | * | 2/1922 | Seaholm | B60R 25/066 70/201 |
| 1,498,160 A | * | 6/1924 | August | E05C 17/20 292/277 |
| 1,552,410 A | * | 9/1925 | Anderson | B60R 25/066 70/206 |
| 1,946,364 A | * | 2/1934 | Smith | B60R 25/04 70/284 |
| 2,046,342 A | * | 7/1936 | Muck | E05B 13/005 292/352 |
| 2,180,272 A | * | 11/1939 | Bastuscheck | B60D 1/065 280/513 |
| 2,222,106 A | * | 11/1940 | Knapp | B26B 19/042 30/43.92 |
| 2,423,540 A | * | 7/1947 | Wills | F24H 9/20 318/668 |
| 2,478,304 A | * | 8/1949 | Mulsow | E05B 3/04 292/349 |
| 2,553,753 A | * | 5/1951 | Devor | G05G 5/24 70/181 |
| 2,561,081 A | * | 7/1951 | Vars | B62D 33/0273 292/268 |
| 2,592,995 A | * | 4/1952 | Anderle | E06B 9/384 160/173 R |
| 2,629,246 A | * | 2/1953 | Schumann | E05B 85/08 70/181 |
| 2,734,373 A | * | 2/1956 | Scherbinski | E05B 13/002 70/13 |
| 2,961,268 A | * | 11/1960 | Russell | E05B 3/003 292/352 |
| 2,987,782 A | * | 6/1961 | Kurowski | F25D 23/028 49/386 |
| 3,237,770 A | * | 3/1966 | Humbert, Jr. | B01D 35/005 210/94 |
| 3,365,224 A | * | 1/1968 | Thome | F16B 12/22 217/65 |
| 3,372,280 A | * | 3/1968 | Auld | G21F 5/02 250/497.1 |
| 4,282,769 A | * | 8/1981 | Sandrock | F16H 61/22 74/473.23 |
| 5,364,154 A | * | 11/1994 | Kaiser | B60P 3/341 135/88.05 |
| 5,388,307 A | * | 2/1995 | Hyde | G05G 1/12 16/441 |
| 5,960,517 A | * | 10/1999 | Sprekeler | E05B 3/065 292/336.3 |
| 9,784,008 B1 | * | 10/2017 | Carolina | E04H 15/48 |
| 10,273,710 B2 | * | 4/2019 | Yang | E04H 15/50 |
| 10,982,464 B2 | * | 4/2021 | Ying | E04H 15/28 |
| 11,002,036 B1 | * | 5/2021 | Zhang | E04H 15/50 |
| 2005/0097829 A1 | * | 5/2005 | Seo | E04H 15/50 52/79.1 |
| 2019/0234102 A1 | * | 8/2019 | Lu | E04H 15/46 |
| 2020/0240168 A1 | * | 7/2020 | Sun | E04H 15/50 |
| 2020/0240169 A1 | * | 7/2020 | Sun | E04H 15/46 |
| 2021/0238880 A1 | * | 8/2021 | Qiu | E04H 15/48 |

\* cited by examiner

ROTARY UNLOCKING CENTRAL LOCK DEVICE FOR FOLDABLE TENT

CROSS-REFERENCE TO RELATED APPLICATION

This application claims the priority benefits of Chinese application serial no. 201810530419.6, filed on May 29, 2018, and Chinese application serial no. 201820809963.X, filed on May 29, 2018. The entirety of each of the above-mentioned patent applications is hereby incorporated by reference herein and made a part of specification.

BACKGROUND OF THE INVENTION

1. Field of the Invention

The invention relates to a field of foldable tent, and particularly relates to a rotary unlocking central lock device for a foldable tent.

2. Description of Related Art

Foldable tents can be unfolded when used, and folded for storage when not used. Also, such tents can block sunlight and rain and are easy to carry around. Therefore, the foldable tents are used extensively in daily life.

Chinese Utility Model Patent No. CN206888665U discloses an unfolding and fixing device of a foldable tent as well as a foldable tent. The unfolding and fixing device of the foldable tent includes a support rod, a bottom base, and a retractable guiding rod. One end of the support rod is hinged with a top frame rod of the foldable tent, and the other end of the support rod is hinged with the bottom base. One end of the guiding rod is connected with a top connecting base of the foldable tent, and the other end of the guiding rod is connected to the bottom base. One end of the top frame rod is hinged with the top connecting base. Locking mechanisms fit with each other are disposed on the bottom base and the guiding rod. When the foldable tent is unfolded and fixed, the bottom base and the guiding rod are latched to each other through the locking mechanisms. The locking mechanism includes an engaging opening arranged on a sidewall of the guiding rod. A button is provided on the bottom base. A plugging tongue configure to fit with the engaging opening is provided on the button. An elastic member configured to apply an elastic force to the button to insert the plugging tongue into the engaging opening is connected with the button.

The unfolding and fixing device is applied in the foldable tent, and the operational procedures of the foldable tent are simplified. However, a button-type unlocking structure is adopted for the locking mechanism of the foldable tent. When such structure is adopted, the structure of the whole unfolding and fixing device is relatively complicated, and a structure such as a pressing button is additionally required in a press-to-unlock process. Therefore, the overall appearance is affected, and the unlocking stability is poor.

SUMMARY OF THE INVENTION

In view of the above, the invention provides a technical solution in which a rotary unlocking central lock device for a foldable tent is designed.

The rotary unlocking central lock device is adapted for a foldable tent. The rotary unlocking central lock device includes a top plate base, a lock rod, a lower plate base, and a rotary base. The rotary base is rotatably fit with the lower plate base. A lock rod latch mechanism is disposed between the rotary base and the lower plate base. A top portion of the lock rod is fixed with the top plate base. A bottom portion of the lock rod penetrates through the lower plate base to fit with the lock rod latch mechanism. The lock rod and the lock rod latch mechanism are locked and unlocked by rotation of the rotary base.

According to an embodiment of the invention, in the rotary unlocking central lock device for the foldable tent, a set of position-limiting pillars are disposed on the rotary base, a set of arc-shaped grooves fit with the position-limiting pillars are arranged on the lower plate base, and after the rotary base is fit with the lower plate base, positions of the position-limiting pillars are limited in the arc-shaped grooves, and the position-limiting pillars are movable in arc-shaped directions of the arc-shaped grooves.

According to an embodiment of the invention, in the rotary unlocking central lock device for the foldable tent, the lock rod latch mechanism includes a latch plate and a lock rod engaging groove arranged on the lock rod. A latch hole is arranged at a middle portion of the latch plate. A pressing arc-shaped surface is disposed on a side portion of the latch plate. A pressing table fit with the pressing arc-shaped surface is disposed on the rotary base. In addition, when the rotary base rotates, the pressing plate presses the pressing arc-shaped surface of the latch plate, and the latch plate is moved, so that the lock rod engaging groove is engaged into or disengaged from the latch hole, so as to allow lock or unlock of the lock rod and the lock rod latch mechanism.

According to an embodiment of the invention, in the rotary unlocking central lock device for the foldable tent, a set of top frame rod connecting bases configured to be hinged with top frame rods of the foldable tent are disposed on the top plate base.

According to an embodiment of the invention, in the rotary unlocking central lock device for the foldable tent, a set of support rod connecting bases configured to be hinged with support rods of the foldable tent are disposed on the lower plate base.

According to an embodiment of the invention, in the rotary unlocking central lock device for the foldable tent, a lock rod hole arranged for the lock rod to penetrate through is arranged at a middle portion of the lower plate base.

According to an embodiment of the invention, in the rotary unlocking central lock device for the foldable tent, the lower plate base and the rotary base are connected through position-limiting screws, and the position-limiting screws penetrate through the arc-shaped grooves and then are threadedly connected with the position-limiting pillars.

According to an embodiment of the invention, in the rotary unlocking central lock device for the foldable tent, a side of the latch plate opposite to the pressing arc-shaped surface is a position-limiting surface, and a position-limiting table fit with the position-limiting surface is disposed on the rotary base.

According to an embodiment of the invention, in the rotary unlocking central lock device for the foldable tent, the latch hole includes a unlocking hole and a position-limiting hole in communication with each other, a diameter of the position-limiting hole is smaller than a diameter of the unlocking hole, the lock rod engaging groove engages into the position-limiting hole to lock the lock rod, the lock rod engaging groove enters the unlocking hole to unlock the lock rod.

According to an embodiment of the invention, in the rotary unlocking central lock device for the foldable tent, an elastic member allowing the latch plate to be restored to an original position is disposed on the latch plate.

The rotary unlocking central lock device for the foldable tent has a reasonable design. When used, locking and unlocking of the lock rod and the lock rod latch mechanism can be realized by rotation of the rotary base. Therefore, the foldable tent can be unfolded and folded conveniently.

Compared with the conventional art, the embodiments of the invention have the following characteristics.

(1) The lock rod latch mechanism according to the embodiments of the invention has a structure with the latch plate and the lock rod engaging groove. Such a structure is simple and easy to assemble. Therefore, the manufacturing cost is reduced.

(2) The lock rod latch mechanism is disposed inside the lower plate base and the rotary base and properly hidden. In addition, such a mechanism does not require to be used with an external component, so the overall appearance is not affected.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
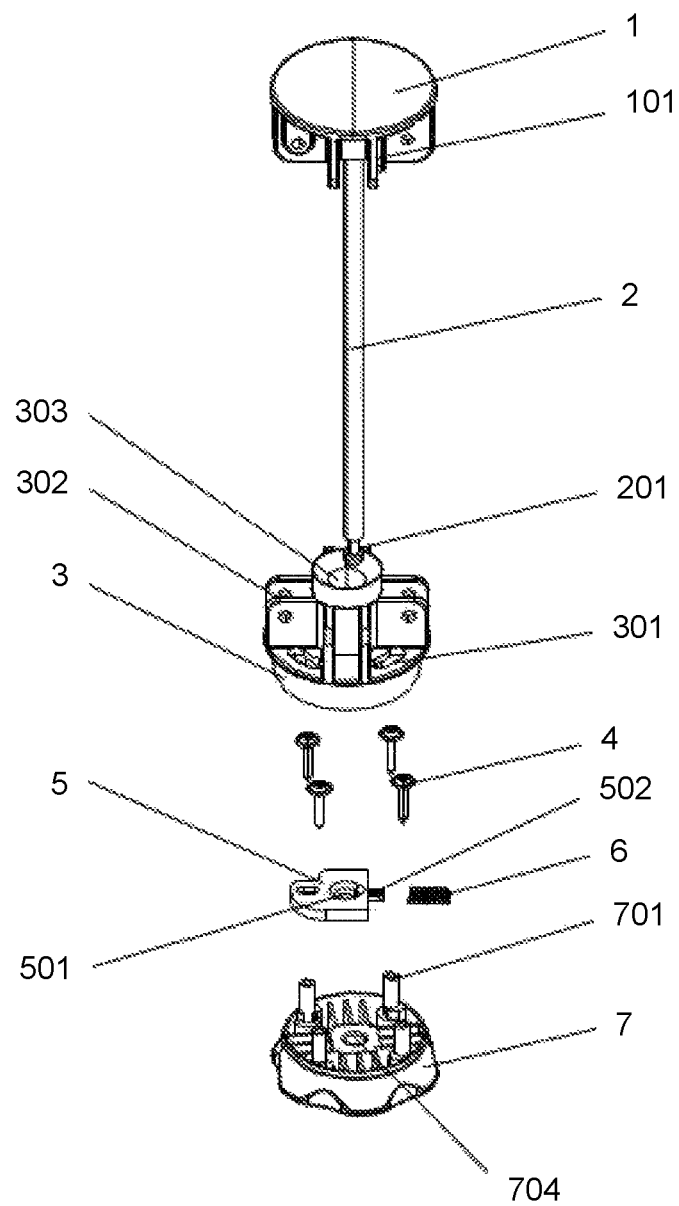
FIG. 1 is a schematic exploded view illustrating a structure according to an embodiment of the invention.

Reference will now be made in detail to the exemplary embodiments of the invention, examples of which are illustrated in the accompanying drawings. Wherever possible, the same reference numbers are used in the drawings and the description to refer to the same or like parts.

In the following, the embodiments of the invention will be described in detail with reference to the accompanying drawings.

Figure 2:
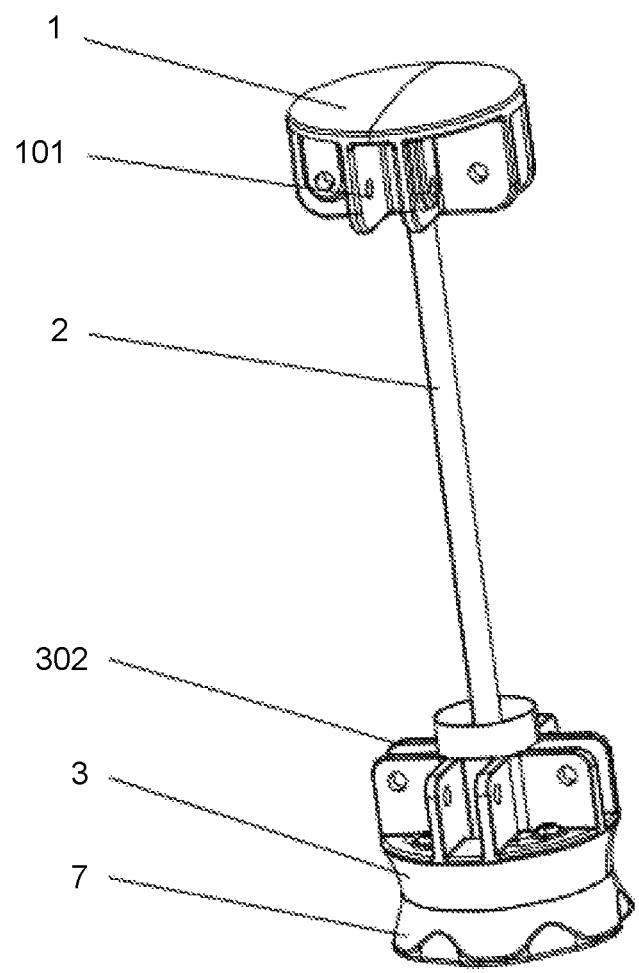
FIG. 2 is a schematic assembled view illustrating the structure according to an embodiment of the invention.

As shown in FIGS. 1 and 2, a rotary unlocking central lock device is adapted for a foldable tent. The rotary unlocking central lock device includes a top plate base 1, a lock rod 2, a lower plate base 3, and a rotary base 7. The rotary base 7 is rotatably fit with the lower plate base 3, and a lock rod latch mechanism is disposed between the rotary base 7 and the lower plate base 3. A top portion of the lock rod 2 is fixed with the top plate base 1. A bottom portion of the lock rod 2 penetrates through the lower plate base 3 to fit with the lock rod latch mechanism. By rotating the rotary base 7, locking and unlocking of the lock rod 2 and the lock rod latch mechanism are realized.

A middle portion of the top plate base 1 is configured to be connected with the lock rod 2, and connection between the central portion of the top plate base 1 and the lock rod 2 may be threaded connection, etc. A set of top frame rod connecting bases 101 are disposed around a periphery of the top plate base 1. The top frame rod connecting bases 101 are configured to be hinged with top frame rods 10 of the foldable tent.

The lock rod 2 may be a cylindrical rod. However, the shape of the lock rod 2 is not limited to a cylindrical shape. For example, the lock rod may also be a square column-shaped rod or the like. A lock rod engaging groove 201 is disposed at the bottom portion of the lock rod 2. In an exemplary embodiment, the lock rod engaging groove 201 may be an annular groove formed by removing an outer circumferential portion of the bottom portion of the lock rod 2 through machining.

A lock rod hole 303 arranged for the lock rod 2 to penetrate therethrough is arranged at a middle portion of the lower plate base 3. A set of support rod connecting bases 302 are disposed on the lower plate base 3. The support rod connecting bases 302 serve to be hinged and fit with support rods 11 of the foldable tent. In a middle portion of the rotary base 7, a lock rod bottom preserving groove 704 is disposed to prevent the lock rod 2 from being stuck with the rotary base 7.

The following structure may allow the rotary base 7 to be rotatably fit with the lower plate base 3. A set of position-limiting pillars 701 are disposed on the rotary base 7, and a set of arc-shaped grooves 301 fit with the position-limiting pillars 701 are arranged on the lower plate base 3. After the rotary base 7 is fit with the lower plate base 3, positions of the position-limiting pillars 701 are limited in the arc-shaped grooves 301 and the position-limiting pillars 701 are movable in the arc-shaped directions of the arc-shaped grooves 301, thereby realizing the rotation between the rotary base 7 and the lower plate base 3. The lower plate base 3 and the rotary base 7 are connected through position-limiting screws 4. The position-limiting screws 4 penetrate through the arc-shaped grooves 301 and then are threadedly connected with the position-limiting pillars 701. In this way, the rotary base 7 and the lower plate base 3 are fixed with each other and are refrained from being detached from each other during rotation. Of course, the positions of the position-limiting pillars 701 and the arc-shaped grooves 301 are interchangeable, that is, the arc-shaped grooves 301 may be disposed on the rotary base 7, and the position-limiting pillars 701 may be disposed on the lower plate base 3. The positions at which the position-limiting pillars 701 and the arc-shaped grooves 301 are arranged may also be different. For example, the position-limiting pillars 701 may be disposed on a top surface of the rotary base 7 or a side surface of the rotary base 7. Similarly, the positions at which the arc-shaped grooves 301 are arranged may also be adjusted according to different positions of the position-limiting pillars 701. In a structure of an exemplary embodiment, four position-limiting pillars 701 may be disposed on the top surface of the rotary base 7. Similarly, four arc-shaped grooves 301 are arranged at positions corresponding to the position-limiting pillars 701 on the lower plate base 3.

Figure 3:
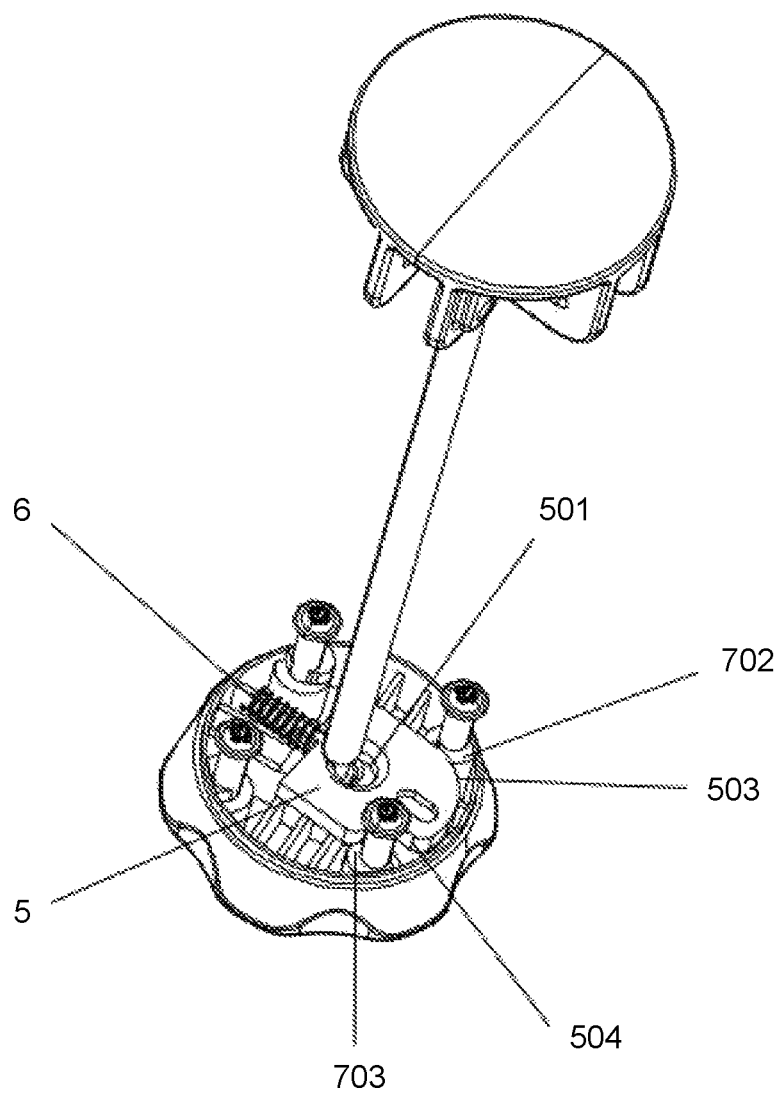
FIG. 3 is a schematic view illustrating a structure when a lock rod is in a locked state according to an embodiment of the invention.
Figure 4:
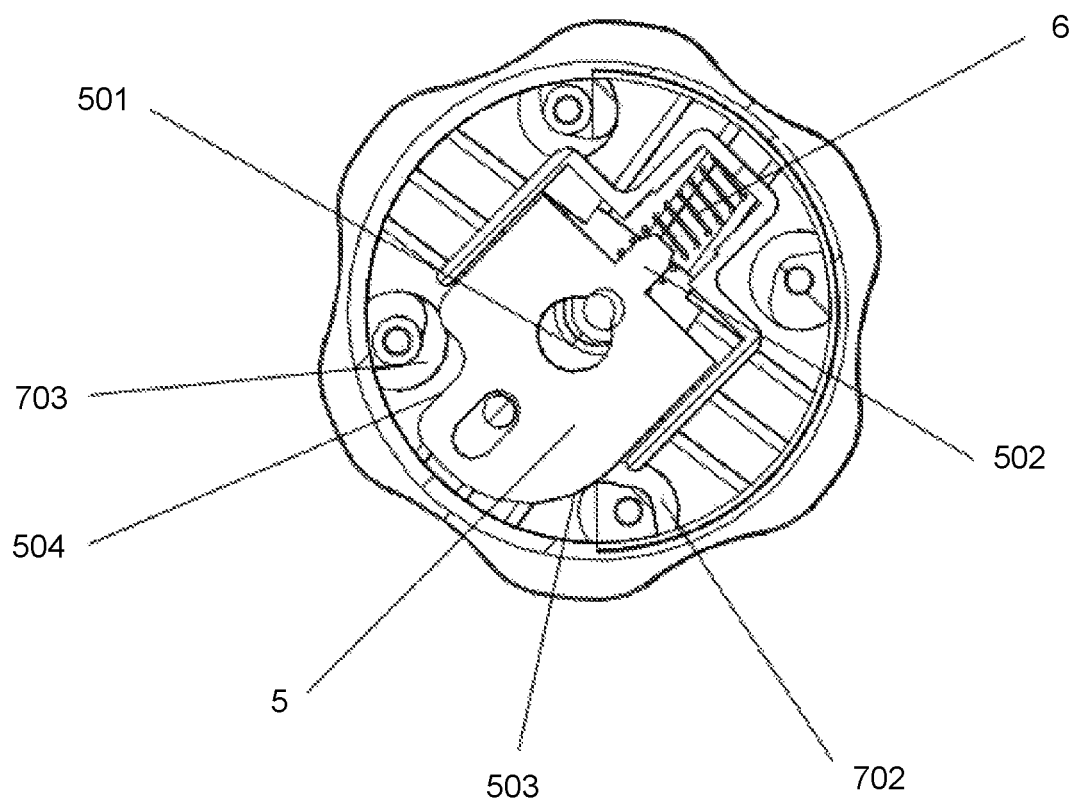
FIG. 4 is a schematic view illustrating that a rotary base is fit with a latch plate according to an embodiment of the invention.
Figure 5:
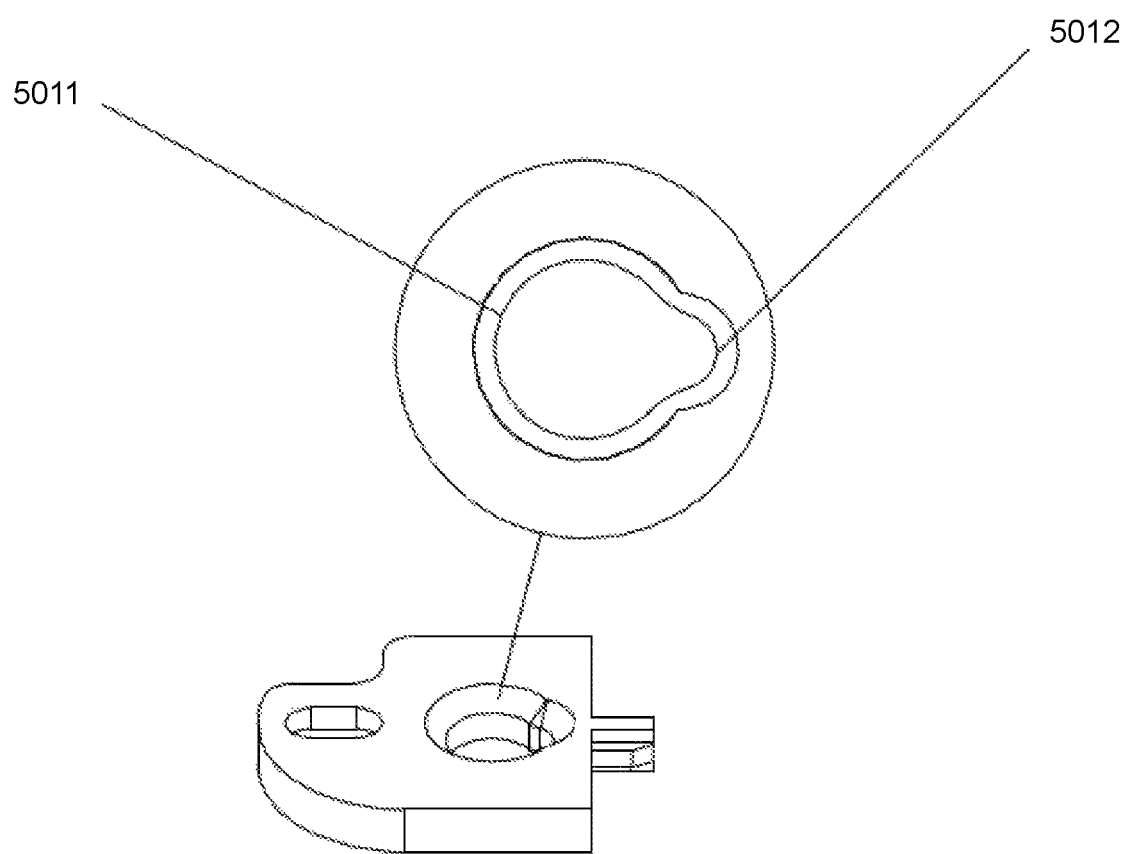
FIG. 5 is a schematic view illustrating a structure of the latch plate according to an embodiment of the invention.

As shown in FIGS. 3, 4, and 5, the lock rod latch mechanism includes a latch plate 5 and the lock rod engaging groove 201. A latch hole 501 is arranged on the latch plate 5. On the latch plate 5, a pressing arc-shaped surface 503 is arranged. On the rotary base 7, a pressing table 702 fit with the pressing arc-shaped surface 503 is disposed. In an exemplary embodiment, the pressing stage 702 may be an arc-shaped protruding table. When the rotary base 7 rotates, the pressing stage 702 is pressed against the pressing arc-shaped surface 503 of the latch plate 5, and the latch plate 5 is moved, so that the lock rod engaging groove 201 is engaged into or disengaged from the latch hole 501, thereby realizing the lock and unlock of the lock rod latch mechanism and the lock rod 2. Of course, in order for the latch plate 5 to be restored to the original position, an elastic member 6 allowing the latch plate 5 to be restored to the original position is disposed on the latch plate 5. The elastic member 6 may be a compression spring. In order to limit a moved position of the rotary base 7, a side of the latch plate 5 opposite to the pressing arc-shaped surface 503 serves as a position-limiting surface 504. A position-limiting table 703 fit with the position-limiting surface 504 is disposed on the rotary base 7. When the rotary base 7 rotates to a certain extent, the position-limiting surface 504 is fit with the position-limiting stage 7 to prevent the latch plate 5 from being moved excessively. In a structure according to an exemplary embodiment, the latch hole 501 includes an unlocking hole 5011 and a position-limiting hole 5012 in communication with each other. A diameter of the position-limiting hole 5012 is smaller than a diameter of the unlocking hole 5011. The lock rod engaging groove 201 is engaged into the position-limiting hole 5012 to lock the lock rod 2. The lock rod engaging groove 201 enters the unlocking hole 5011 to unlock the lock rod 2. In a structure according to an exemplary embodiment, the pressing table 702 and the position-limiting table 703 are combined with the position-limiting pillars 701. In other words, protruding stages are formed on outer circumferences of the position-limiting pillars 701 to form the pressing table 702 and the position-limiting table 703. Of course, the position-limiting pillar 701 may also be directly adopted as the pressing table 702 or the position-limiting table 703.

The working principle of the rotary unlocking central lock device for the foldable tent is as follows. In an unlocked state, the lock rod engaging groove 201 of the lock rod 2 is located in the unlocking hole 5011. When the lock rod 2 needs to be locked, the rotary base 7 is rotated, and the pressing table 702 on the rotary base 7 is also rotated, so as to press the pressing arc-shaped surface 503 of the latch plate 5. The latch plate 5 generates rotational movement, so as to allow the lock rod engaging groove 201 to engage into the position-limiting hole 5012, thereby realizing the locking of the lock rod 2. When the locking of the lock rod 2 is completed, the latch plate 5 is restored to the original position under the act of the elastic member 6. When the lock rod 2 needs to be unlocked, the rotary base 7 is also rotated, and the pressing table 702 on the rotary base 7 is rotated, so as to press the pressing arc-shaped surface 503 of the latch plate 5. The latch plate 5 is rotationally moved, so that the position-limiting hole 5012 is detached from the lock rod engaging groove 201, thereby realizing the unlocking of the lock rod 2. When the unlocking of the lock rod 2 is completed, the latch plate 5 is restored to the original position under the act of the elastic member 6.

Figure 6:
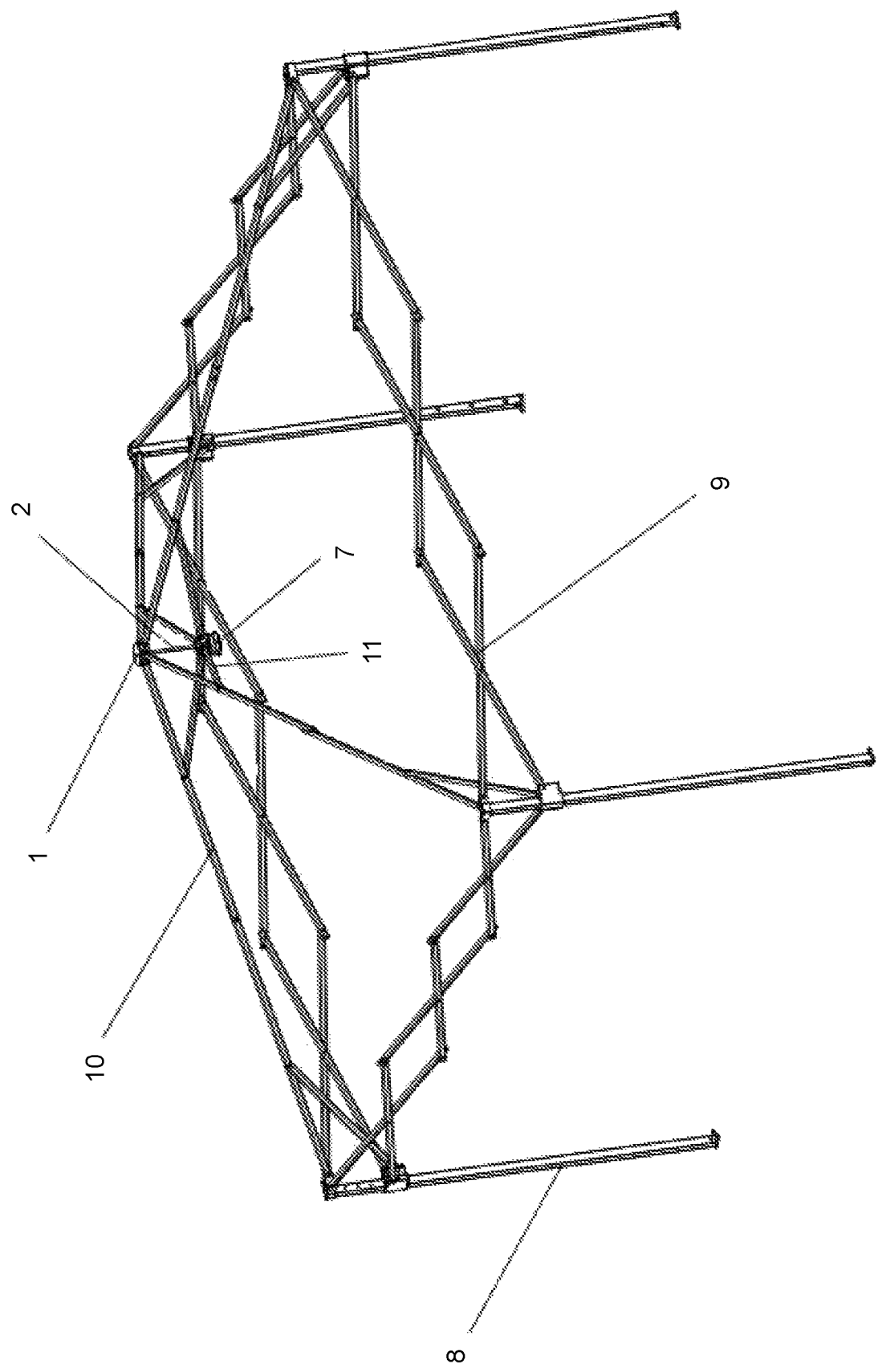
FIG. 6 is a schematic view illustrating a usage state according to an embodiment of the invention.

As shown in FIG. 6, when the rotary unlocking central lock device for the foldable tent is installed, the top frame rod connecting bases 101 of the top plate base 1 are hinged with the top frame rods 10. The other ends of the top frame rods 10 are connected to support legs 8. The support legs 8 are connected with each other via hinge beams 9. The support rod connecting bases 302 of the lower plate base 3 are hinged with the support rods 11, and the other ends of the support rods 11 are hinged and fit with the top frame rods 10.

With the rotary unlocking central lock device for the foldable tent, the locking and unlocking of the foldable tent can be quickly realized.

Figure 7:
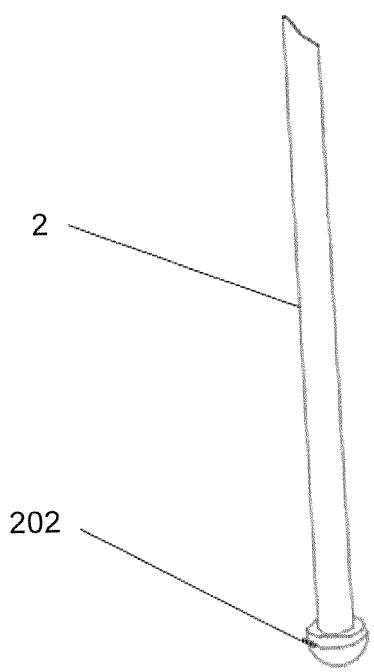
FIG. 7 and FIG. 8 are additional structural views of a lock rod according to an embodiment of the invention.

In the above embodiment, the lock rod 2 may realize the lock structure even if the lock rod engaging groove 201 is not used, specifically described as follows. As shown in FIG. 7, as another embodiment of the lock rod 2, the bottom of the lock rod 2 is not provided with the rod engaging groove 201, while the bottom of the lock rod 2 is provided with an engaging boss; by the engaging boss 202 acting in place of the rod engaging groove 201, the engaging boss 202 is located at the bottom of the lock rod 2 and forms a platform structure with the end of the lock rod 2.

In the unlocked state, the bottom of the lock rod 2 is located in the unlocking hole 5011. When the lock rod 2 has to be locked, the rotary base 7 is rotated, and the pressing table 702 on the rotary base 7 is rotated, so as to press the pressing arc-shaped surface 503 of the locking plate 5 for allowing the latch plate 5 to generate a rotational displacement, thereby snapping the lock rod 2 into the position-limiting hole 5012, at which time, the engaging boss 202 is located below the position-limiting hole 5012 to realize the locking of the lock rod 2; then, when the lock rod 2 is locked, the latch plate 5 is reset by the elastic member 6. Similarly, when the lock rod 2 has to be unlocked, the rotary base 7 is also rotated, and the pressing table 702 on the rotary base 7 is rotated, so as to press the pressing arc-shaped surface 503 of the locking plate 5 for allowing the latch plate 5 to generate a rotational displacement, thereby disengaging the position-limiting hole 5012 from the lock rod 2 to realize unlocking of the lock rod 2; then, when the lock rod 2 is unlocked, the latch plate 5 is reset by the elastic member 6.

Figure 8:
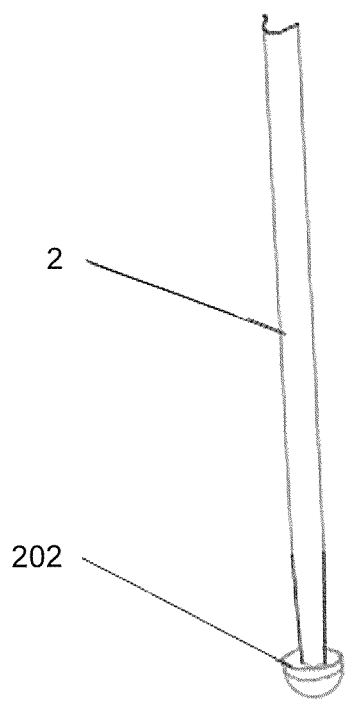

As shown in FIG. 8, as another embodiment of the lock rod 2, on the basis of the structure of FIG. 7, the lock rod 2 is a tapered rod, that is, the diameter at lower end is smaller than diameter at the upper end.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rotary unlocking central lock device adapted for a foldable tent, the rotary unlocking central lock device comprising a top plate base, a lock rod, a lower plate base, and a rotary base, wherein the rotary base is rotatably fit with the lower plate base, a lock rod latch mechanism is disposed between the rotary base and the lower plate base, a top portion of the lock rod is fixed with the top plate base, a bottom portion of the lock rod penetrates through the lower plate base to fit with the lock rod latch mechanism, and locking and unlocking of the lock rod and the lock rod latch mechanism are realized by rotation of the rotary base, wherein a set of position-limiting pillars are disposed on the rotary base, a set of arc-shaped grooves fit with the position-limiting pillars are arranged on the lower plate base, and after the rotary base is fit with the lower plate base, positions of the position-limiting pillars are limited in the arc-shaped grooves, and the position-limiting pillars are movable in arc-shaped directions of the arc-shaped grooves.

2. The rotary unlocking central lock device as claimed in claim 1, wherein the lock rod latch mechanism comprises a latch plate and a lock rod engaging groove arranged on the lock rod, a latch hole is arranged at a middle portion of the latch plate, a pressing arc-shaped surface is disposed on a side portion of the latch plate, a pressing table fit with the pressing arc-shaped surface is disposed on the rotary base, and when the rotary base rotates, the pressing table presses the pressing arc-shaped surface of the latch plate, and the latch plate is moved, such that the lock rod engaging groove is engaged into or disengaged from the latch hole, so as to realize the lock or unlock of the lock rod and the lock rod latch mechanism.

3. The rotary unlocking central lock device as claimed in claim 1, wherein a set of top frame rod connecting bases configured to be hinged with top frame rods of the foldable tent are disposed on the top plate base.

4. The rotary unlocking central lock device as claimed in claim 1, wherein a set of support rod connecting bases configured to be hinged with support rods of the foldable tent are disposed on the lower plate base.

5. The rotary unlocking central lock device as claimed in claim 1, wherein a lock rod hole arranged for the lock rod to penetrate through is arranged at a middle portion of the lower plate base.

6. The rotary unlocking central lock device as claimed in claim 1, wherein the lower plate base and the rotary base are connected through position-limiting screws, and the position-limiting screws penetrate through the arc-shaped grooves and then are threadedly connected with the position-limiting pillars.

7. The rotary unlocking central lock device as claimed in claim 2, wherein a side of the latch plate opposite to the pressing arc-shaped surface is a position-limiting surface, and a position-limiting table fit with the position-limiting surface is disposed on the rotary base.

8. The rotary unlocking central lock device as claimed in claim 2, wherein the latch hole comprises an unlocking hole and a position-limiting hole in communication with each other, a diameter of the position-limiting hole is smaller than a diameter of the unlocking hole, the lock rod engaging groove engages into the position-limiting hole to lock the lock rod, the lock rod engaging groove enters the unlocking hole to unlock the lock rod.

9. The rotary unlocking central lock device as claimed in claim 7, wherein the latch hole comprises an unlocking hole and a position-limiting hole in communication with each other, a diameter of the position-limiting hole is smaller than a diameter of the unlocking hole, the lock rod engaging groove engages into the position-limiting hole to lock the lock rod, the lock rod engaging groove enters the unlocking hole to unlock the lock rod.

10. The rotary unlocking central lock device as claimed in claim 2, wherein an elastic member allowing the latch plate to be restored to an original position is disposed on the latch plate.

11. The rotary unlocking central lock device as claimed in claim 7, wherein an elastic member allowing the latch plate to be restored to an original position is disposed on the latch plate.

12. A rotary unlocking central lock device adapted for a foldable tent, the rotary unlocking central lock device comprising a top plate base, a lock rod, a lower plate base, and a rotary base, wherein the rotary base is rotatably fit with the lower plate base, a lock rod latch mechanism is disposed between the rotary base and the lower plate base, a top portion of the lock rod is fixed with the top plate base, a bottom portion of the lock rod penetrates through the lower plate base to fit with the lock rod latch mechanism, and locking and unlocking of the lock rod and the lock rod latch mechanism are realized by rotation of the rotary base, wherein the lock rod latch mechanism comprises a latch plate and a lock rod engaging groove arranged on the lock rod, a latch hole is arranged at a middle portion of the latch plate, a pressing arc-shaped surface is disposed on a side portion of the latch plate, a pressing table fit with the pressing arc-shaped surface is disposed on the rotary base, and when the rotary base rotates, the pressing table presses the pressing arc-shaped surface of the latch plate, and the latch plate is moved, such that the lock rod engaging groove is engaged into or disengaged from the latch hole, so as to realize the lock or unlock of the lock rod and the lock rod latch mechanism.

13. The rotary unlocking central lock device as claimed in claim 12, wherein a side of the latch plate opposite to the pressing arc-shaped surface is a position-limiting surface, and a position-limiting table fit with the position-limiting surface is disposed on the rotary base.

14. The rotary unlocking central lock device as claimed in claim 12, wherein the latch hole comprises an unlocking hole and a position-limiting hole in communication with each other, a diameter of the position-limiting hole is smaller than a diameter of the unlocking hole, the lock rod engaging groove engages into the position-limiting hole to lock the lock rod, the lock rod engaging groove enters the unlocking hole to unlock the lock rod.

15. The rotary unlocking central lock device as claimed in claim 13, wherein the latch hole comprises an unlocking hole and a position-limiting hole in communication with each other, a diameter of the position-limiting hole is smaller than a diameter of the unlocking hole, the lock rod engaging groove engages into the position-limiting hole to lock the lock rod, the lock rod engaging groove enters the unlocking hole to unlock the lock rod.

16. The rotary unlocking central lock device as claimed in claim 12, wherein an elastic member allowing the latch plate to be restored to an original position is disposed on the latch plate.

17. The rotary unlocking central lock device as claimed in claim 13, wherein an elastic member allowing the latch plate to be restored to an original position is disposed on the latch plate.

18. A rotary unlocking central lock device adapted for a foldable tent, the rotary unlocking central lock device comprising a top plate base, a lock rod, a lower plate base, and a rotary base, wherein the rotary base is rotatably fit with the lower plate base, a lock rod latch mechanism is disposed between the rotary base and the lower plate base, a top portion of the lock rod is fixed with the top plate base, a bottom portion of the lock rod penetrates through the lower plate base to fit with the lock rod latch mechanism, and locking and unlocking of the lock rod and the lock rod latch mechanism are realized by rotation of the rotary base, wherein a set of top frame rod connecting bases configured to be hinged with top frame rods of the foldable tent are disposed on the top plate base.

19. A rotary unlocking central lock device adapted for a foldable tent, the rotary unlocking central lock device comprising a top plate base, a lock rod, a lower plate base, and a rotary base, wherein the rotary base is rotatably fit with the lower plate base, a lock rod latch mechanism is disposed between the rotary base and the lower plate base, a top portion of the lock rod is fixed with the top plate base, a bottom portion of the lock rod penetrates through the lower plate base to fit with the lock rod latch mechanism, and locking and unlocking of the lock rod and the lock rod latch mechanism are realized by rotation of the rotary base, wherein a set of support rod connecting bases configured to be hinged with support rods of the foldable tent are disposed on the lower plate base.

* * * * *